United States Patent
Bellenger

(10) Patent No.: US 10,589,847 B2
(45) Date of Patent: Mar. 17, 2020

(54) LOCKABLE WHEEL ACTUATOR DISENGAGEMENT SYSTEM ON AN AIRCRAFT LANDING GEAR

(71) Applicant: SAFRAN LANDING SYSTEMS, Velizy Villacoublay (FR)

(72) Inventor: Vincent Bellenger, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 355 days.

(21) Appl. No.: 15/463,028

(22) Filed: Mar. 20, 2017

(65) Prior Publication Data
US 2017/0267335 A1  Sep. 21, 2017

(30) Foreign Application Priority Data

Mar. 21, 2016 (FR) ...................................... 16 52426

(51) Int. Cl.
 *B64C 25/40* (2006.01)
 *F16D 25/00* (2006.01)
 *F16D 28/00* (2006.01)
(52) U.S. Cl.
 CPC ............ *B64C 25/405* (2013.01); *F16D 25/00* (2013.01); *F16D 28/00* (2013.01); *Y02T 50/823* (2013.01)
(58) Field of Classification Search
 CPC ....... B64C 25/00; B64C 25/10; B64C 25/405; B64C 25/58
 See application file for complete search history.

(56) References Cited

U.S. PATENT DOCUMENTS

| 2012/0217340 A1* | 8/2012 | Essinger | ............... B64C 25/405 244/50 |
| 2012/0228921 A1* | 9/2012 | Essinger | ............... B64C 25/405 301/6.2 |

(Continued)

FOREIGN PATENT DOCUMENTS

| EP | 2 543 593 A2 | 1/2013 |
| EP | 2 982 603 A1 | 2/2016 |

(Continued)

OTHER PUBLICATIONS

French Preliminary Search Report issued in FR 16 52426 dated Nov. 28, 2016, 2 Pages.

(Continued)

*Primary Examiner* — Philip J Bonzell
*Assistant Examiner* — Tye William Abell
(74) *Attorney, Agent, or Firm* — Sughrue Mion, PLLC

(57) ABSTRACT

A landing gear (0) for an aircraft comprising a wheel (R), a system (1) for rotationally driving the wheel that is mobile between a clutched position and a safety position by passing through a declutched position, and a manoeuvring system (3) to displace the driving system (1) between its declutched and clutched positions. The gear comprises an elastic return (4) for returning the driving system (1) to its safety position and first and second abutments (51a, 52a) that are separated as long as the driving system (1) is away from its safety position and in contact with one another when the driving system (1) is in safety position. The first and second abutments (51a, 52a) oppose the passing of the driving system (1) from its safety position to its declutched position when the abutments are in contact with one another.

14 Claims, 4 Drawing Sheets

(56) References Cited

U.S. PATENT DOCUMENTS

2015/0225075 A1* 8/2015 Renier .................. B64C 25/405
                                                        244/50
2016/0039519 A1* 2/2016 Didey ........................ F16H 1/06
                                                      244/103 S
2016/0221669 A1* 8/2016 Didey .................. B64C 25/405
2016/0373184 A1* 12/2016 Oder .................. G06F 9/45533

FOREIGN PATENT DOCUMENTS

| FR | 3 017 367 A1 | 8/2015 |
| WO | 2011/073587 A1 | 6/2011 |
| WO | 2015/040364 A1 | 3/2015 |

OTHER PUBLICATIONS

French Written Opinion issued in FR 16 52426 dated Nov. 28, 2016, 6 Pages.

* cited by examiner

LOCKABLE WHEEL ACTUATOR DISENGAGEMENT SYSTEM ON AN AIRCRAFT LANDING GEAR

The invention relates to the general field of landing gears for aircraft equipped with a system for rotationally driving the wheel of the landing gear.

BACKGROUND OF THE INVENTION

The patent document FR3011531 A1 for example teaches of a landing gear for aircraft comprising:
- at least one wheel for the taxiing of the aircraft on the ground;
- a system for rotationally driving the wheel that is mobile between a clutched position with respect to the wheel and a safety position by passing through a declutched position with respect to the wheel;
- a manoeuvring system linked to the driving system to displace it between its declutched and clutched positions.

It has been found that, in case of a breakdown of the manoeuvring system which controls the passage between the declutched and clutched positions, there is a risk of the driving system remaining mechanically coupled with the wheel. It is consequently desirable to provide a solution that makes it possible, in case of breakdown of the manoeuvring system, to uncouple the driving system with respect to the wheel.

OBJECT OF THE INVENTION

One object of the present invention is to provide an aircraft landing gear that resolves all or part of the above-mentioned problems.

SUMMARY OF THE INVENTION

To this end, there is proposed, according to the invention a landing gear for aircraft comprising:
- at least one wheel for the taxiing of the aircraft on the ground;
- a system for rotationally driving the wheel that is mobile between a clutched position with respect to the wheel and a safety position by passing through a declutched position with respect to the wheel;
- a manoeuvring system linked to the driving system to displace it between its declutched and clutched positions.

The landing gear according to the invention is essentially characterized in that can be manoeuvred system comprises an actuator that can be manoeuvred between first and second extreme configurations of the actuator, this actuator being arranged so that, when it is in its first extreme configuration, the driving system is then held by this actuator in its declutched position and so that, when this actuator is in its second extreme configuration, the driving system is then held by this actuator in its clutched position, the landing gear further comprising:
- an elastic return means arranged to exert an elastic return load on the driving system towards its safety position; and
- first and second abutments arranged to be separated from one another as long as the driving system is away from its safety position and to be in contact with one another when the driving system is in its safety position, these first and second abutments being arranged so that, when these abutments are in contact with one another and a load is exerted on the driving system to displace it from its safety position to its declutched position, these abutments oppose the passing of the driving system from its safety position to its declutched position.

The system for rotationally driving the wheel of the landing gear is arranged to be displaced between a clutched position with respect to the wheel and a safety position in which it is disengaged from the wheel, that is to say that it is not clutched.

Between these extreme positions of the driving system, that are the clutched position and the safety position, there is an intermediate position which is called declutched position. During the passage between the declutched position and the safety position, the driving system is always declutched relative to the wheel. When the driving system is declutched with respect to the wheel, there is no mechanical link, between this driving system and the wheel, that can convey a load to rotate the wheel by this driving system.

Moreover, when the driving system is in its declutched position, it is then close to the wheel relative to its separation from the wheel when it is in its safety position.

In this declutched position, as in the safety position, the driving system is still declutched with respect to the wheel.

The use of an elastic return means arranged to exert an elastic return load on the driving system from its clutched position to its safety position makes it possible:
- in normal operation of the landing gear, to assist the passage of the driving system from its clutched position to its declutched position, which simplifies the work of the manoeuvring system; and
- in case of an operating fault on the manoeuvring system, for example in case of a mechanical break C of the manoeuvring system (see FIG. 2d), the elastic return means favours the passage of the driving system to its safety position in which it is separated from its declutched and clutched positions, the risk of accidental clutching with the wheel is thus reduced.

The first and second abutments together define an extreme position of displacement of the driving system, called safety position, beyond which the driving system cannot go. Moreover, these first and second abutments are arranged so that, when these abutments are in contact with one another (that is to say when the driving system is in its safety position) any load exerted on this driving system to displace it from its safety position to its declutched position is countered by these first and second abutments which oppose the passage of the driving system from its safety position to its declutched position.

Since the elastic return means exerts a load favouring the holding of the driving system in this safety position with the first and second abutments in contact with one another, in case of failure of the manoeuvring system, the driving system is displaced away from its clutched position to the safety position and the elastic return means opposes the driving system moving away from this safety position.

The driving system is then secured in its safety position on the one hand by virtue of the first and second abutments in contact with one another and on the other hand by virtue of the elastic return means which also opposes the displacement of the driving system out of this safety position.

In this safety position, the driving system can no longer interfere with the wheel.

For an understanding of the invention, the term extreme configuration designates an extreme position which limits the amplitude of manoeuvre possible with the actuator.

Thus, the expression "actuator that can be manoeuvred between first and second extreme configurations of the actuator" means that the manoeuvring of the actuator is limited between two extreme positions, the amplitude of the movement performed by the actuator being thus limited between these two extreme positions/configurations.

The result thereof is that the manoeuvring of the actuator (between its first and second extreme configurations) makes it possible to displace the driving system only between its clutched and declutched positions without ever allowing, under the effect of the manoeuvring of the actuator, the displacement of the driving system from its declutched position to its safety position.

Thus, the actuator is arranged in the landing gear to displace the driving system only between its declutched position and its clutched position, without being able to displace the driving system between its declutched position and its safety position.

Thus, as long as the actuator manoeuvres the driving system, the latter is never displaced between its declutched position and its safety position.

On the other hand, if the actuator can no longer manoeuvre the driving system, for example in case of breakage of the actuator or of one of the links between the manoeuvring system and the driving system or the support, the driving system is then free to be displaced since it is no longer displaced under the effect of the manoeuvring system.

The elastic return means then forces the displacement of the driving system to its safety position where it is held by the first and second abutments.

The invention thus allows the driving system to be made safe in case of failure of the manoeuvring system.

This is particularly advantageous since there is safety at multiple levels.

In case of a simple fault in the manoeuvring system, for example an actuator manoeuvring energy supply fault, the elastic return means then forces the displacement of the driving system to its declutched position, the actuator arriving in first extreme configuration stops the displacement of the driving system in the declutched position, thus prohibiting the passage of driving means from its declutched position to its safety position. In this case, the displacement of the driving system to its clutched position remains possible by once again manoeuvring the actuator between its extreme configurations (for example by supplying the actuator with manoeuvring energy).

In case of a significant manoeuvring system fault, for example in case of mechanical break allowing the displacement of the manoeuvring system between its declutched and safety positions, then the effect of the elastic return means forces the displacement of the driving system to its safety position. Having arrived in this safety position of the manoeuvring system, the first and second abutments come into contact with one another and then oppose the return of the driving system to any of the declutched or clutched positions under the effect of a load exerted on the driving system.

Even a load which would be generated by the manoeuvring system on the driving system to displace it from its safety position to its declutched position is then inoperative since the first and second abutments oppose this displacement.

The landing gear is thus secured against a serious failure of the manoeuvring system.

The invention also makes it possible to segregate the functions:

of elastic return of the driving means (via the elastic return means);

of manoeuvring of this driving means (via the manoeuvring system and do so as long as the actuator can be manoeuvred between its extreme configurations); and of keeping the driving system safe via the contact of the first and second abutments (when the actuator can no longer be manoeuvred between its extreme configurations to displace the driving system).

BRIEF DESCRIPTION OF THE DRAWINGS

The invention will be better understood in light of the following description of a particular embodiment of the invention, referring to the attached figures in which.

DETAILED DESCRIPTION OF THE INVENTION

The invention relates to a landing gear 0 for aircraft. This landing gear 0 is partially illustrated in FIGS. 1, 2a, 2b, 2c, 2d and 3 and comprises a leg extending along a longitudinal axis X0 of extension of the leg. For reasons of clarity, the leg is not illustrated and only its longitudinal axis X0 is schematically represented.

The landing gear 0 is linked to a supporting structure of the aircraft via its leg.

A terminal end of this leg bears at least one axle 10 about which at least one wheel R for the taxiing of the aircraft on the ground is mounted to rotate. For reasons of clarity, only portions of the axle 10 and of the wheel R are represented.

Figure 2A:
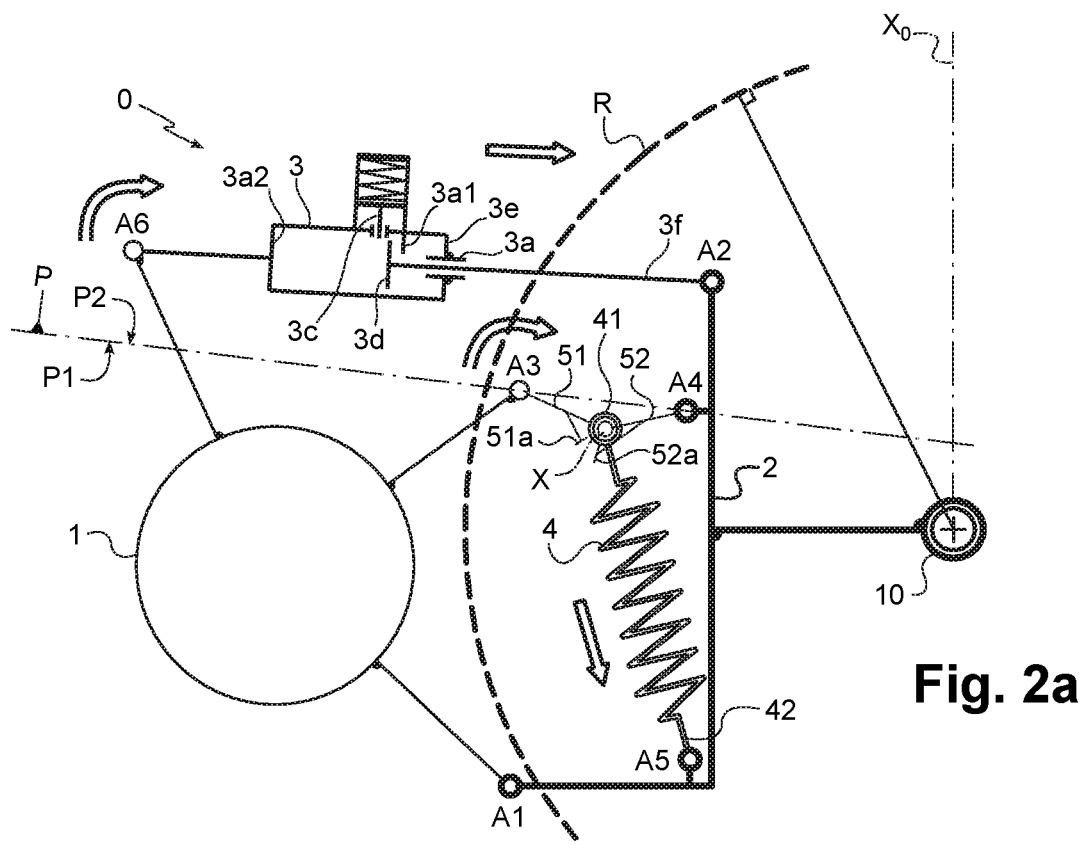
FIG. 2a illustrates the landing gear of FIG. 1 when the driving system is displaced from its declutched position to its clutched position.
Figure 2B:
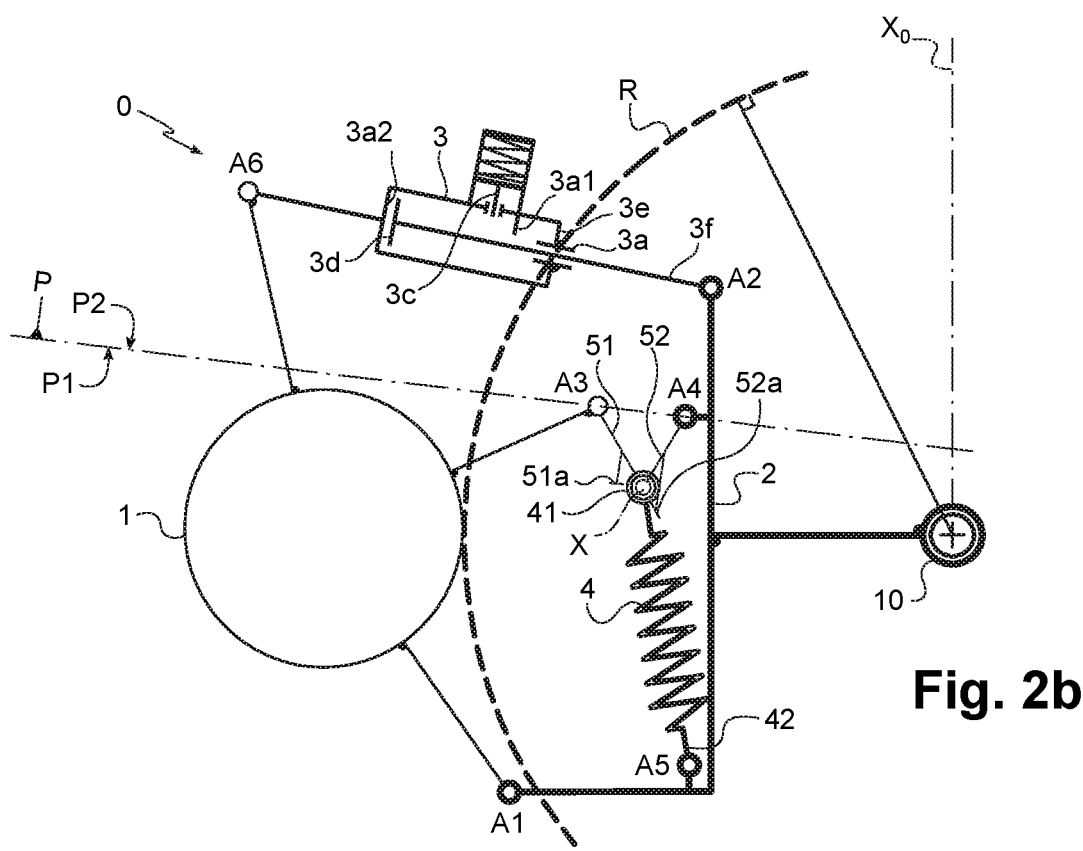
FIG. 2b illustrates the landing gear of FIG. 1 when the driving system is in clutched position.
Figure 2C:
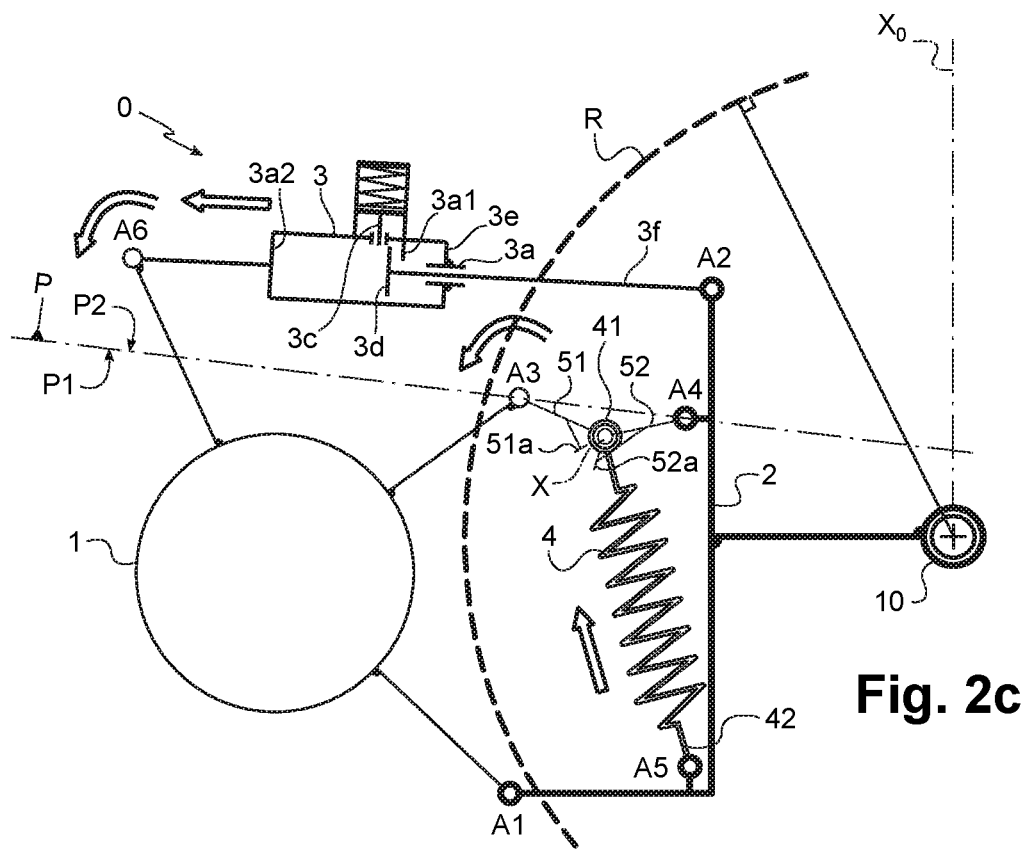
FIG. 2c illustrates the landing gear of FIG. 1 when the driving system is displaced from its clutched position to its declutched position.

The wheel R is driven in rotation by a driving system 1 which can be a motor such as a rotary electric motor capable of transmitting a driving torque for the wheel R when it is in clutched position as in FIG. 2b.

The wheel R can be fixedly linked to a driving crown wheel and, in this case, the driving system 1 in clutched position will be engaged against this crown wheel, for example by toothed wheel work.

Alternatively, the driving system 1 can comprise a roller that comes to rub directly against the wheel to drive it in rotation.

Figure 1:
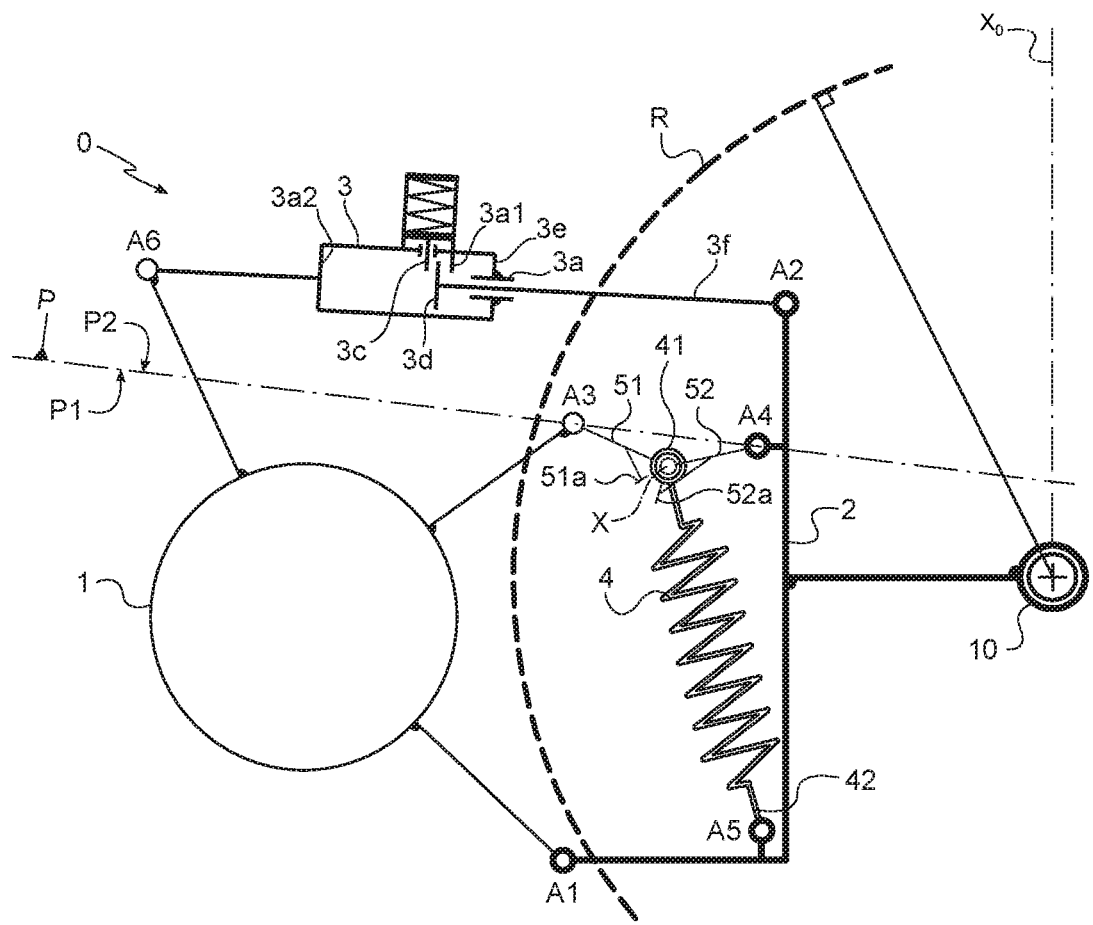
FIG. 1 illustrates a portion of the landing gear according to the invention when the driving system is in declutched position.
Figure 2D:
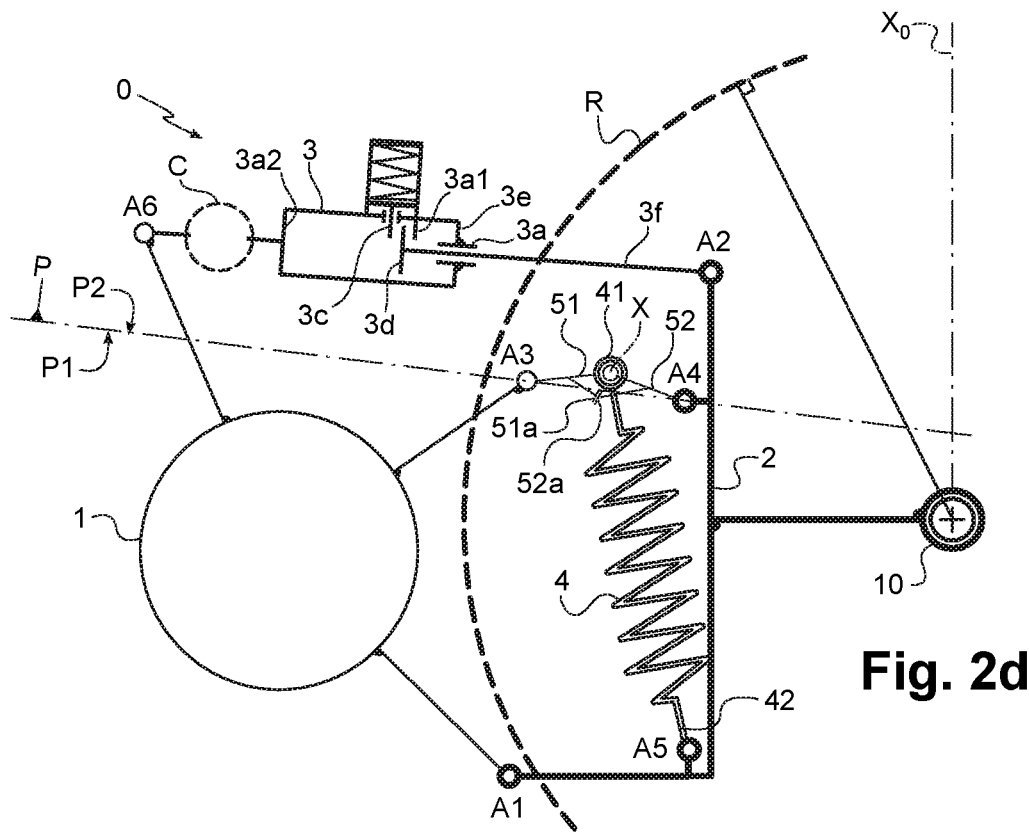
FIG. 2d illustrates the landing gear of FIG. 1 when the driving system is in its safety position, blocked in this position under the combined effect of the elastic return means and of the first and second abutments which are in contact with one another and oppose the displacement of the driving system to its clutched position, the actuator is here broken (reference C) which has resulted in the passage to safety position.

The driving system 1 is mobile between a clutched position, represented in FIG. 2b, and a safety position, represented in FIG. 2d, passing through a declutched position represented in FIG. 1. In other words, when the driving system 1 is displaced from its clutched position to its safety position, and vice versa, it necessarily passes through its declutched position. This declutched position being an intermediate position between the clutched position and the safety position.

An elastic return means 4 is arranged to exert an elastic return load on the driving system 1 from its clutched position to its safety position.

The gear 0 also comprises a manoeuvring system 3 linked to the driving system 1 to displace it between its declutched and clutched positions. Ideally, this manoeuvring system 3 is not designed to displace the driving system beyond its declutched position, between this declutched position and the safety position.

First and second abutments 51a, 52a are arranged to be separated from one another as long as the driving system 1 is away from its safety position and to be in contact with one another when the driving system 1 is in its safety position.

As illustrated in FIG. 2d, these first and second abutments 51a, 52a are arranged to oppose the passage of the driving system 1 from its safety position to its declutched position when these abutments are in contact with one another.

Thus, as long as the driving system 1 is between its clutched and declutched positions, the abutments 51a and 52a remain separated from one another and the manoeuvring of the driving system 1 by the manoeuvring system 3 is allowed. In other words, as long as they are not in contact with one another, these first and second abutments 51a, 52a allow the displacements of the driving system including its passage to its declutched position and to its clutched position.

On the other hand, when the driving system 1 is in its safety position, the first and second abutments are in contact with one another and prohibit manoeuvring the driving system from its safety position to any one of the declutched or clutched positions.

Preferentially, the system 1 according to the invention comprises a support part 2 which is linked mechanically to the axle 10 about which the wheel R is mounted to rotate.

This link between the support part 2 and the axle is either produced by assembly of the axle 10 on the support part 2, or produced using an intermediate mechanical structure formed by a plurality of intermediate parts rigidly linking the axle 10 to the support part 2.

This support part 2 has at least one portion which extends radially with respect to the axis X0 by going outwards from the leg of the landing gear.

In one embodiment, the support part 2 is a rod of landing gear 0 and the portion of support part 2 which extends radially with respect to the axis X0 is situated in the lower part of this rod, the upper part of the rod being that furthest away from the wheel R.

In another alternative embodiment of the preceding embodiment, the support part 2 is a part distinct from the rod of the gear and is fixed to this rod via assembly means. In this embodiment, the support part is still situated in the lower part of the rod.

Ideally, the driving system of the wheel 1 is mounted to rotate relative to this support part 2 via a first articulation A1.

The manoeuvring system 3 is also mounted to rotate relative to this support part 2 via a second articulation A2. The manoeuvring system is also mounted to rotate relative to the driving system 1 via a sixth articulation A6 which is at a distance from the second articulation A2. The manoeuvring system 3 extends mostly between these articulations A2 and A6. In the present case, this manoeuvring system 3 has an actuator 3 that can be manoeuvred only between first and second extreme configurations which are first and second positions of end-of-travel of the actuator.

The gear 0 comprises a first mechanical stop 3a1, to define the first extreme configuration of the actuator and a second mechanical stop 3a2 to define the second extreme configuration of the actuator 3a.

In the present case, these first and second mechanical stops 3a1 and 3a2 are borne by the actuator 3.

In the embodiment presented in FIGS. 1 to 2d, the first and second mechanical stops 3a1, 3a2 are arranged in the actuator 3a. However, one and/or the other of these first and second mechanical stops 3a1, 3a2 could also be formed outside the actuator.

A mechanical stop is an abutment against which another part comes to abut so as to limit a displacement of this other part by contact with this mechanical stop. Thus, when the actuator is displaced from its second extreme configuration to its first extreme configuration, on arrival in its first extreme configuration, the first mechanical stop forms an abutment prohibiting the displacement of the actuator beyond the first extreme configuration. Conversely, when the actuator is displaced from its first extreme configuration to its second extreme configuration, on arrival in its second extreme configuration, the second mechanical stop forms an abutment prohibiting the displacement of the actuator beyond its second extreme configuration.

The actuator can thus be manoeuvred only between its first and second extreme configurations and can no longer be manoeuvred beyond these first and second extreme configurations.

The actuator also comprises a jacket 3e and a part 3d that is mobile inside this jacket 3e all along the manoeuvring of the actuator between its first and second extreme configurations. In other words, any manoeuvring of the actuator between its extreme configurations is accompanied by a displacement of the mobile part and, conversely, any displacement of the mobile part is associated with a manoeuvring of the actuator between its extreme configurations.

The first abutment 3a1 is placed to limit the travel of the mobile part 3d when the actuator arrives in its first extreme configuration, this first abutment then bearing against a first side of the mobile part 3d.

The second abutment 3a2 is placed to limit the travel of the mobile part 3d when the actuator arrives in its second extreme configuration, this second abutment 3a2 then bearing against a second side of the mobile part 3d.

The first and second sides of the mobile part 3d are placed on either side of the mobile part 3d which is here a piston linked to a piston rod 3f.

The end of this rod 3f is linked to the support part 2 via the second articulation A2 to thus rotationally mount the manoeuvring system 3 relative to this support part 2.

The gear 0 also comprises locking mechanisms 3c that can move between an unlocked configuration and a locked configuration. Preferentially, these locking mechanisms 3c are borne by the actuator.

These locking mechanisms 3c in unlocked configuration allow the displacement of the actuator between its first and second extreme configurations and these locking mechanisms 3c in locked configuration immobilize the actuator 3a in its first extreme configuration by prohibiting the manoeuvring thereof from its first extreme configuration to its second extreme configuration.

The locking mechanisms 3c are arranged to pass from the unlocked configuration to the locked configuration when the actuator arrives in its first extreme configuration.

Preferentially, the locking mechanisms 3c have a detection portion to automatically detect the arrival of the actuator in its first position and to automatically pass from the unlocked configuration to the locked configuration.

This detection portion can, for example, be a finger pushed by a mobile part of the actuator when it arrives in its first configuration, this finger, when pushed, driving the displacement of the locking mechanisms 3c into locked configuration. The locking mechanisms can also comprise a spring then exerting a load on certain parts of the locking mechanism to maintain the locked configuration.

The locking mechanisms 3c are preferentially arranged to pass from the locked configuration to the unlocked configuration under the effect of a feed of a chamber of the actuator with a hydraulic fluid having a pressure above a predetermined minimum pressure threshold.

Similarly, if the actuator is an electromechanical actuator, the locking mechanisms 3c can be arranged to pass from the locked configuration to the unlocked configuration under the effect of the electrical powering of the actuator with a predetermined minimum threshold electrical power.

The locking mechanisms 3c comprise clamps or segments which adopt distinct positions relative to the jacket of the actuator 3e when the locking mechanisms are displaced between the unlocked configuration and the locked configuration.

These clamps or these segments are engaged mechanically with said mobile part 3d of the actuator to prohibit the displacement of this mobile part 3d relative to the jacket 3e when the actuator is in its first extreme configuration and the locking mechanisms 3c are in the locked configuration. The actuator is then immobilized by the clamps or segments of the locking mechanisms in its first extreme configuration.

These clamps or these segments are separated from said mobile part 3d of the actuator to allow the displacement of this mobile part 3d relative to the jacket 3e when the locking mechanisms 3c are in the unlocked configuration. The actuator then being manoeuvrable between its first and second extreme configurations.

Furthermore, the landing gear comprises first and second connecting rods 51, 52 mutually articulated about an articulation axis X of the connecting rods. The first connecting rod 51 is articulated relative to the driving system 1 via a third articulation A3. The second connecting rod 52 is articulated relative to the support part 2 via a fourth articulation A4.

The first abutment 51a is positioned on the first connecting rod 51 and the second abutment 52a is positioned on the second connecting rod 52.

The limit position of displacement of the driving system, that is to say the safety position reached in FIG. 2d, is thus defined simply using abutments borne by the connecting rods 51, 52, these connecting rods having a function to reinforce the mechanical link between the driving system 1 and the support part 2.

The elastic return means 4 extends between first and second ends 41, 42 of the elastic return means 4. The first end 41 of the elastic means 4 is mounted to rotate relative to said first and second connecting rods 51, 52 at said articulation axis X of these connecting rods.

The second end 42 of the elastic return means 4 is mounted to rotate relative to the support part 2 via a fifth articulation A5.

Figure 3:
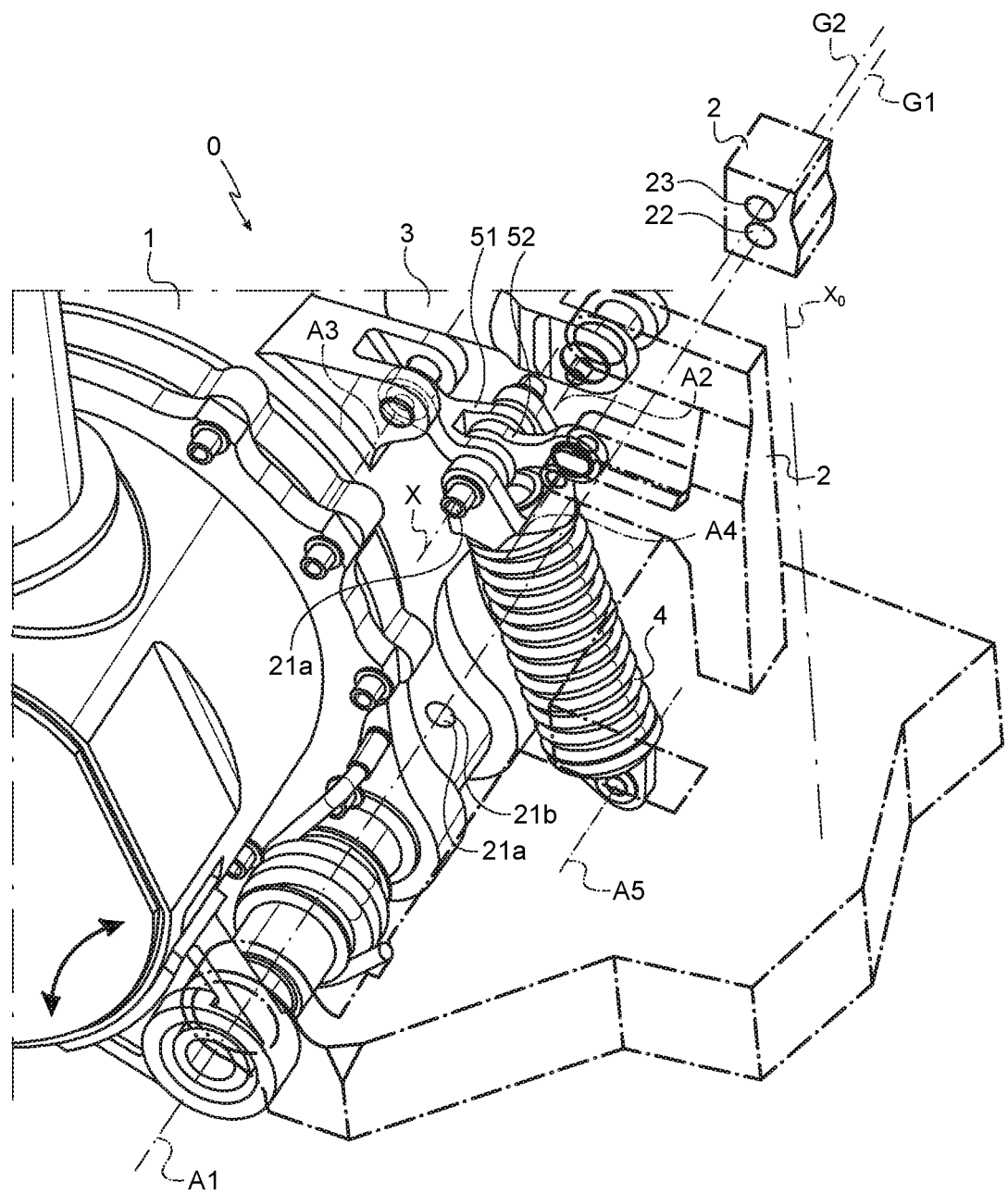
FIG. 3 represents a landing gear according to the invention with a link part on which are respectively articulated, at different points of the link part, the system for rotationally driving the wheel, the manoeuvring system, the elastic return means and the first and second connecting rods.

As illustrated in FIGS. 1 to 3, the first, second, fourth and fifth articulations A1, A2, A4, A5 are arranged at different locations of the support part 2, these different locations being separated from one another.

A deformable structure is thus obtained making it possible to transmit to the driving system 1:
  an elastic force, via a simple articulation axis X of the connecting rods; and
  a manoeuvring load via the manoeuvring system 3 linked on the one hand to the support part via the articulation A2, and on the other hand to the driving system 1 via the articulation A6.

This mechanism, consisting of the two connecting rods mutually articulated on the axis X, can be used to amplify the elastic force transmitted to the driving system 1 relative to the force actually generated by the elastic return means on the articulation axis X. In effect, the closer the connecting rods are to a position of alignment in a same plane P of the third and fourth articulations A3, A4 with the articulation axis X of the connecting rods, the more the force transmitted by these connecting rods to the driving system 1 to force it to its safety position is amplified relative to the elastic load generated on the axis X by the elastic return means. This amplification of the load favours the passage of the actuator from its second extreme configuration to its first extreme configuration.

The third and fourth articulations A3, A4 are respectively formed by mutually parallel pivoting axes which extend longitudinally in a plane P.

The other articulations, in this case the first, second, fifth, sixth articulations A1, A2, A5, A6 and the articulation axis X of the connecting rods are respectively formed by pivoting axes. All these pivoting axes of the articulations A1, A2, A3, A4, A5, A6 and of the articulation axis X of the connecting rods are mutually parallel.

Ideally, the articulation axis X of the connecting rods is arranged to be located facing a first face P1 of a plane P passing through the third and fourth articulations A3, A4 when the driving system 1 is in its declutched position (see FIG. 1) and to be facing a second face P2 of this plane P when the driving system 1 is in its safety position (see FIG. 2d).

In other words, upon the passage of the driving system 1 from its safety position to its declutched position, or, conversely, from its declutched position to its safety position, there is a moment where the articulation axis X is located in the plane P which passes through the third A3 and fourth A4 articulations. These third and fourth articulations A3, A4 are then aligned with the articulation axis X. It will be noted that this plane P is displaced with these third and fourth articulations A3, A4.

When the driving system 1 passes from its declutched position to its safety position, the connecting rods 51, 52 are displaced relative to one another so as to bring the abutments 51a, 52a closer to one another until these abutments 51a, 52a touch. The driving system is then in its safety position illustrated in FIG. 2d.

Thus, when the driving system 1 is displaced from its declutched position (FIG. 2c) to its safety position (FIG. 2d), on arrival in this safety position, it is blocked by the abutments 51a, 52a which prohibit it from going beyond this safety position.

These first and second connecting rods 51, 52 and the abutments 51a, 52a form, with the articulation axis X of the connecting rods, a toggle joint.

When the driving system 1 passes from its declutched position to its clutched position, the connecting rods 51, 52 are displaced relative to one another, by pivoting about the axis X, so that the abutments 51a, 52a are separated from one another. These abutments 51*a*, 52*a* thus allow the passage of the driving system from its declutched position to the clutched position.

Since the elastic return means 4 exerts an elastic load which favours the passage of the driving system 1 from its declutched position to its safety position, in case of breakdown of the manoeuvring system 3, the driving system 1 is forced to pass to its safety position. This safety position is reached when the abutments 51*a*, 52*a* come into contact with one another and prohibit the displacement of the driving system 1 beyond this safety position.

As explained previously, the toggle-joint arrangement of the connecting rods 51, 52 and of the abutments 51*a*, 52*a* means that any load exerted on the driving system 1 to displace it from its safety position to its declutched position generates an opposite load on the abutments. Thus, even if a load managed to be exerted on the driving system 1 to displace it from its safety position to its declutched position, the abutments then tend to be compressed against one another and they prohibit, with the connecting rods, this displacement of the driving system 1 out of its safety position to its declutched position.

The driving system 1 thus remains locked in its safety position by the abutments 51*a*, 52*a* bearing against one another.

To make the driving system 1 pass from its safety position to its declutched position, it is then necessary to perform a ground maintenance operation.

For example, this maintenance operation may consist in forcing the displacement of the connecting rods 51, 52 by going against the elastic return means 4 so that the articulation axis X is displaced to the other side of the plane P and is located facing the first face P1 of the plane P.

This maintenance operation may also consist in dismantling the elastic return means 4 and the actuator that is known to be probably damaged because it has been forced outside of the range of its manoeuvrability, by going beyond its first extreme configuration, into a range of the actuator in which it cannot be manoeuvred.

The elastic return load exerted using the elastic return means 4 on the articulation axis X when the driving system 1 is in its safety position makes it possible to force the contact between these abutments 51*a*, 52*a*. This favours holding the driving system 1 in its safety position.

Only a load exerted, on the elastic return means 4, to go against the elastic return load, makes it possible to displace the articulation axis X of the connecting rods with respect to the support part 2 and separate the abutments 51*a*, 52*a* from one another. The driving system 1 can then be moved from its safety position (FIG. 2*d*) and be displaced to its declutched position (FIG. 1).

In case of breakdown of the manoeuvring system 3, the elastic return means 4 forces the passage of the driving system 1 to its safety position in which it is held. The risk of the driving system 1 coming to be accidentally mechanically engaged with the wheel is thus minimized.

Typically, the manoeuvring system 3 comprises an actuator 3*a* that can be manoeuvred between first and second extreme configurations of the actuator 3*a*. This actuator 3*a* is arranged so that, when it is in its first extreme configuration, the driving system 1 is then held by the actuator 3*a* in its declutched position and so that, when this actuator 3*a* is in its second extreme configuration, the driving system 1 is then held by this actuator 3*a* in its clutched position.

Thus, in normal operation, the actuator makes it possible only to displace the driving system 1 between its clutched and declutched positions, without ever allowing the displacement to the safety position which is reached only in case of malfunction of the manoeuvring system (for example breakdown of the actuator or of an actuator attachment).

In the example presented in FIGS. 1 to 3, the actuator 3*a* is a telescopic actuator of hydraulic or electrical type.

As schematically represented in FIG. 3, first and second perforations 21*a*, 22 are arranged to be in alignment relative to one another when the driving system 1 is in declutched position and to allow the passage of a pin through these first and second perforations 21*a*, 22 thus aligned. This makes it possible to hold the driving system 1 in its declutched position by inserting a pin. It is thus possible to secure the declutched position to, for example, deactivate the rotational driving function of the wheel. This is useful in ground maintenance operations.

Here, the pin (not represented) extends along the axis G1 and passes through the first and second perforations 21*a*, 22 to immobilize the driving system 1 in declutched position.

The gear 0 can also comprise third 21*b* and fourth 23 perforations arranged to be in alignment relative to one another when the driving system 1 is in safety position and to allow the passage of a pin through these third and fourth perforations 21*b*, 23 thus aligned. This makes it possible to hold the driving system 1 in its safety position.

Ideally, as illustrated in FIG. 3, the first and third perforations 21*a*, 21*b* are formed on the driving system 1, these first and third perforations 21*a*, 21*b* being able to be combined in one and the same perforation.

The second and fourth perforations 22, 23 can be formed through the support part 2 or through another part mounted on the support part.

Ideally, the pin is conformed to be able to pass through the first and second perforations 21*a*, 22 and to hold the driving system 1 in declutched position, and to be able to pass through the third and fourth perforations 21*b*, 23 to hold the driving system 1 in its safety position.

Other perforations can be produced to allow the passage of the pin in two distinct portions of the gear and to immobilize the driving system in its clutched position.

The invention claimed is:

1. A landing gear (0) for aircraft comprising:
 at least one wheel (R) for the taxiing of the aircraft on the ground;
 a system (1) for rotationally driving the wheel that is mobile between a clutched position with respect to the wheel (R) and a safety position by passing through a declutched position with respect to the wheel; and
 a manoeuvring system (3) linked to the driving system (1) to displace the driving system (1) between a declutched position and a clutched position;
 wherein the manoeuvring system comprises an actuator (3*a*) that can be manoeuvred between first and second extreme configurations of the actuator (3*a*), the actuator being arranged so that, when the actuator is in the first extreme configuration, the driving system (1) is then held by the actuator (3*a*) in the declutched position and so that, when the actuator (3*a*) is in the second extreme configuration, the driving system (1) is then held by the actuator (3*a*) in the clutched position,
 wherein the landing gear further comprising:
 an elastic return means (4) arranged to exert an elastic return load on the driving system (1) towards a safety position; and
 first and second abutments (51*a*, 52*a*) arranged to be separated from one another as long as the driving system (1) is away from the safety position and to be in contact with one another when the driving system (1) is in the safety position, the first and second abutments (51*a*, 52*a*) being arranged so that, when these abutments are in contact with one another and a load is exerted on the driving system (1) to displace the driving system from the safety position to the declutched position, the abutments oppose the passing of the driving system (1) from the safety position to the declutched position.

2. The aircraft landing gear (0) according to claim 1, in which the actuator (3*a*) is a telescopic actuator of hydraulic or electrical type.

3. The aircraft landing gear (0) according to claim 1, comprising first and second perforations (21*a*, 22) arranged to be in alignment relative to one another when the driving system (1) is in declutched position and to allow the passage of a pin through the first and second perforations (21*a*, 22) thus aligned to hold the driving system (1) in the declutched position.

4. The aircraft landing gear (0) according to claim 1, comprising third (21*b*) and fourth (23) perforations arranged to be in alignment relative to one another when the driving system (1) is in safety position and to allow the passage of a pin through the third and fourth perforations (21*b*, 23) thus aligned to hold the driving system (1) in the safety position.

5. The aircraft landing gear (0) according to claim 1, comprising a second mechanical stop (3*a*2) to define the second extreme configuration of the actuator (3*a*), the second mechanical stop being borne by the actuator (3*a*).

6. The aircraft landing gear (0) according to claim 1, comprising a support part (2), the wheel driving system (1) being mounted to rotate relative to the support part (2) via a first articulation (A1), the manoeuvring system (3) being mounted to rotate relative to the support part (2) via a second articulation (A2), the landing gear comprising first and second connecting rods (51, 52) mutually articulated about an articulation axis (X) of the connecting rods, the first connecting rod (51) being also articulated relative to the driving system (1) via a third articulation (A3), the second connecting rod (52) being also articulated relative to the support part (2) via a fourth articulation (A4), the first abutment (51*a*) being positioned on the first connecting rod (51) and the second abutment (52*a*) being positioned on the second connecting rod (52).

7. The aircraft landing gear (0) according to claim 6 in which the elastic return means (4) extends between first and second ends (41, 42) of the elastic return means, the first end (41) of the elastic return means (4) being mounted to rotate relative to said first and second connecting rods (51, 52) at said articulation axis (X) of the connecting rods, the second end (42) of the elastic return means (4) being mounted to rotate relative to the support part (2) via a fifth articulation (A5), the first, second, fourth and fifth articulations (A1, A2, A4, A5) being arranged at different positions on the support part (2) which are separated from one another.

8. The aircraft landing gear (0) according to claim 6, in which said articulation axis (X) of the connecting rods is arranged to be located facing a first face (P1) of a plane (P) passing through the third and fourth articulations (A3, A4) when the driving system (1) is in the declutched position and to be located facing a second face (P2) of the plane (P) when the driving system (1) is in the safety position.

9. The aircraft landing gear (0) according to claim 6, in which the manoeuvring system (3) which is mounted to rotate relative to the support part (2) via the second articulation (A2) is also mounted to rotate relative to the driving system (1) via a sixth articulation (A6) which is at a distance from the second articulation (A2).

10. The aircraft landing gear (0) according to claim 1, comprising:
    a first mechanical stop (3*a*1) to define the first extreme configuration of the actuator; and
    locking mechanisms (3*c*) that can move between an unlocked configuration and a locked configuration;
    the locking mechanisms (3*c*) in unlocked configuration allowing the displacement of the actuator between the first and second extreme configurations and the locking mechanisms (3*c*) in locked configuration immobilizing the actuator (3*a*) in the first extreme configuration by preventing the manoeuvring thereof from the first extreme configuration to the second extreme configuration.

11. The aircraft landing gear (0) according to claim 10, in which the locking mechanisms are arranged to pass from the unlocked configuration to the locked configuration when the actuator arrives in the first extreme configuration.

12. The aircraft landing gear (0) according to claim 11, in which the actuator bears the locking mechanisms.

13. The aircraft landing gear (0) according to claim 12, in which:
    the actuator comprises a jacket (3*e*) and a part (3*d*) that is mobile inside the jacket (3*e*) all along the manoeuvring of the actuator between the first and second extreme configurations;
    the locking mechanisms comprise clamps or segments which adopt distinct positions relative to the jacket of the actuator when the locking mechanisms are displaced between the unlocked configuration and the locked configuration;
    the clamps or the segments being mechanically engaged with said mobile part (3*d*) of the actuator to prohibit the displacement of the mobile part (3*d*) relative to the jacket (3*e*) when the actuator is in the first extreme configuration and the locking mechanisms (3*c*) are in the locked configuration, the actuator being then immobilized by the clamps or segments of the locking mechanisms in its first extreme configuration; and
    the clamps or the segments being separated from said mobile part (3*d*) of the actuator to allow the displacement of the mobile part (3*d*) relative to the jacket (3*e*) when the locking mechanisms (3*c*) are in the unlocked configuration, the actuator then being manoeuvrable between the first and second extreme configurations.

14. The aircraft landing gear (0) according to claim 11, in which the locking mechanisms are arranged to pass from the locked configuration to the unlocked configuration under the effect of a feed of a chamber of the actuator with a hydraulic fluid having a pressure above a predetermined pressure threshold.

* * * * *